(12) United States Patent
Lee et al.

(10) Patent No.: US 10,528,466 B2
(45) Date of Patent: Jan. 7, 2020

(54) STORAGE DEVICES INCLUDING LOGICAL TO PHYSICAL ADDRESS MAPPING AND METHODS OF OPERATING

(71) Applicant: Samsung Electronics Co., Ltd., Suwon-si, Gyeonggi-do (KR)

(72) Inventors: Jong-Won Lee, Seoul (KR); Dashevsky Shmuel, Ramat-Gan (IL); Moshe Twitto, Givat Shmuel (IL); Elona Erez, Tel-Aviv (IL); Eran Hof, Ramat-Gan (IL); Jun-Jin Kong, Yongin-si (KR); Avner Dor, Kfar Saba (IL); Michael Erlihson, Petah Tikva (IL)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 23 days.

(21) Appl. No.: 16/002,151

(22) Filed: Jun. 7, 2018

(65) Prior Publication Data
US 2018/0357164 A1    Dec. 13, 2018

(30) Foreign Application Priority Data
Jun. 9, 2017    (KR) .................. 10-2017-0072721

(51) Int. Cl.
*G06F 12/06*    (2006.01)
*G06F 12/1009*    (2016.01)

(52) U.S. Cl.
CPC .......... *G06F 12/06* (2013.01); *G06F 12/1009* (2013.01); *G06F 2212/1008* (2013.01); *G06F 2212/2022* (2013.01); *G06F 2212/7201* (2013.01)

(58) Field of Classification Search
None
See application file for complete search history.

(56) References Cited

U.S. PATENT DOCUMENTS

| | | |
|---|---|---|
| 7,676,133 B2 | 3/2010 | Lampert et al. |
| 8,488,381 B2 | 7/2013 | Kim et al. |
| 8,553,466 B2 | 10/2013 | Han et al. |
| 8,559,235 B2 | 10/2013 | Yoon et al. |
| 8,654,587 B2 | 2/2014 | Yoon et al. |
| 8,762,661 B2 | 6/2014 | Ng et al. |
| 8,935,223 B2 | 1/2015 | Ganesh et al. |
| 9,176,812 B1 | 11/2015 | Northcott et al. |
| 9,229,876 B2 | 1/2016 | Slepon |
| 9,423,978 B2 | 8/2016 | Long et al. |
| 2011/0233648 A1 | 9/2011 | Seol et al. |
| 2014/0059279 A1 | 2/2014 | He et al. |
| 2014/0101369 A1 | 4/2014 | Tomlin et al. |
| 2014/0173186 A1 | 6/2014 | Randall et al. |
| 2014/0317374 A1 | 10/2014 | Culley et al. |

(Continued)

*Primary Examiner* — Kevin Verbrugge
(74) *Attorney, Agent, or Firm* — Muir Patent Law, PLLC

(57) ABSTRACT

A method of operating a storage device including a nonvolatile memory can be provided by receiving, from a host, address change information including changing logical addresses for data to be stored in the nonvolatile memory. Physical addresses can be sequentially allocated to the changing logical addresses included in the address change information to provide a first journal. A portion of at least one physical address allocated to the changing logical addresses can be removed to provide a second journal and the second journal can be stored in the nonvolatile memory.

20 Claims, 20 Drawing Sheets

(56) References Cited

U.S. PATENT DOCUMENTS

2014/0334232 A1 11/2014 Nam et al.
2016/0117256 A1 4/2016 Dor et al.
2016/0210241 A1 7/2016 Jacobs et al.

STORAGE DEVICES INCLUDING LOGICAL TO PHYSICAL ADDRESS MAPPING AND METHODS OF OPERATING

CROSS-REFERENCE TO RELATED APPLICATION

This application claims the benefit of Korean Patent Application No. 10-2017-0072721, filed on Jun. 9, 2017, in the Korean Intellectual Property Office, the disclosure of which is incorporated herein in its entirety by reference.

BACKGROUND

The inventive concept relates to the field of solid state storage, and more particularly, to address mapping in solid state storage devices.

In general a storage device may include a flash translation layer (FTL) that maps logical addresses to physical addresses of the storage device. A mapping table including mapping information about the logical addresses and the physical addresses may be stored in the storage device. To prevent data loss, when there are changes to the mapping table, a journal may be used to log the changes to the mapping table before execution of the changes.

SUMMARY

Embodiments according to the inventive concept can provide storage devices including logical to physical address mapping and methods of operating such devices. Pursuant to these embodiments, a method of operating a storage device including a nonvolatile memory can be provided by receiving, from a host, address change information including changing logical addresses for data to be stored in the nonvolatile memory. Physical addresses can be sequentially allocated to the changing logical addresses included in the address change information to provide a first journal. A portion of at least one physical address allocated to the changing logical addresses can be removed to provide a second journal and the second journal can be stored in the nonvolatile memory.

In some embodiments, a method of operating a storage device can be provided where the storage device includes a nonvolatile memory having a plurality of blocks, each of the plurality of blocks including a plurality of pages with a respective physical address for each page. The method can be provided by receiving at least one address unit including a plurality of logical addresses and sorting the plurality of logical addresses in ascending or descending order to provide a plurality of sorted logical addresses. A physical address of a first level page in each block can be sequentially allocated to the plurality of sorted logical addresses in a first mapping table until all first level pages are allocated and then a physical address of a second level page in each block can be sequentially allocated to the plurality of sorted logical addresses in the first mapping table.

In some embodiments, a storage device can include a nonvolatile memory having a plurality of pages corresponding to a plurality of physical addresses, respectively, where the nonvolatile memory can be divided into a meta area storing addresses, and a user area storing data. A flash translation layer (FTL) can be configured to receive a plurality of logical addresses from an external source and configured to allocate the plurality of physical addresses to the plurality of logical addresses and an address sorter can be configured to sort the plurality of logical addresses in ascending or descending order to provide a plurality of sorted logical addresses and configured to output the plurality of sorted logical addresses to the flash translation layer, where the FTL is configured to deterministically allocate the plurality of physical addresses to the sorted plurality of logical addresses.

BRIEF DESCRIPTION OF THE DRAWINGS

Embodiments of the inventive concept will be more clearly understood from the following detailed description taken in conjunction with the accompanying drawings in which.

DETAILED DESCRIPTION OF EMBODIMENTS

Embodiments according to the inventive concept are described hereinafter with reference to the accompanying drawings. The inventive concept may, however, be embodied in many different forms and should not be construed as limited to the embodiments set forth herein. Rather, these embodiments are provided so that this disclosure will be thorough and complete, and will fully convey the scope of the present inventive subject matter to those skilled in the art. Like numbers refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Figure 1:
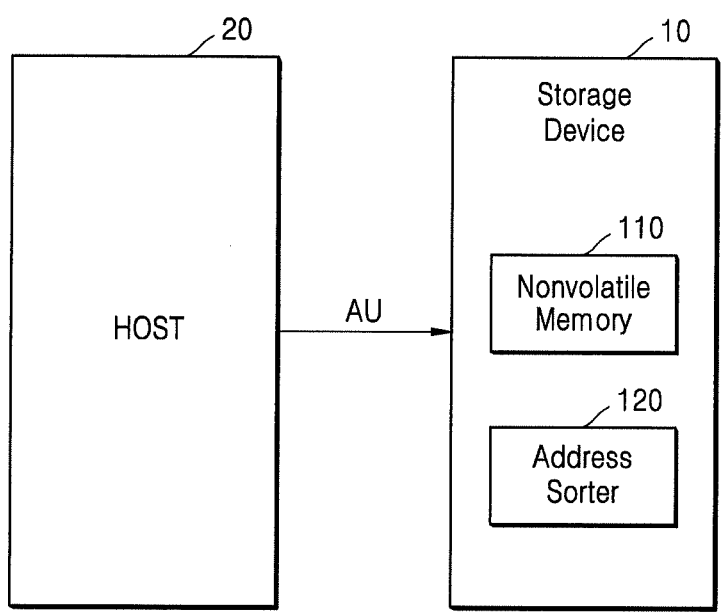
FIG. 1 is a block diagram of a storage device according to an example embodiment of the inventive concept.

FIG. 1 is a block diagram of a storage system according to an example embodiment.

Referring to FIG. 1, a storage system 1 may include a storage device 10 and a host 20. The storage device 10 may include a nonvolatile memory 110 and an address sorter 120. When a write operation is performed in the storage device 10, the host 20 may output data and an address unit (AU) including at least one logical address corresponding to the data. Herein, a group of logical addresses continuously output from the host 20 to the storage device 10 is referred to as an address unit (AU).

As described above, the nonvolatile memory 110 may retain data even when the power supply is interrupted. The nonvolatile memory 110 may include a memory cell array connected to word lines, string selection line, ground selection line, and bit lines. The memory cell array may include a plurality of NAND cell strings. Each of the NAND cell strings may be connected to corresponding bit line through a string selection transistor. The nonvolatile memory 110 may include super blocks including a plurality of memory blocks. The plurality of memory blocks may include a plurality of pages. The plurality of pages may include a plurality of memory cells. The nonvolatile memory 110 may include a 2-dimensional (2D) memory array or a 3-dimensional (3D) memory array. Other types of nonvolatile memory may be used.

The 3D memory array may include an active area arranged in a silicon substrate and circuits associated with operation of memory cells, wherein the circuits may be monolithically formed on or in the silicon substrate with at least one physical level of the memory cell arrays. The term "monolithic" may refer to a structure in which circuits are stacked on the layers of lower levels of the memory cell array.

In some embodiments, the 3D memory array may include cell strings arranged in a vertical direction such that at least one memory cell is on another memory cell. The at least one memory cell may include a charge trap layer. U.S. Pat. Nos. 7,679,133, 8,553,466, 8,654,587, 8,559,235, and US 2011/0233648, the disclosures of which are incorporated herein by reference, disclose appropriate configurations of 3D memory arrays with multiple levels which share word lines and/or bit lines. US 2014-0334232 and U.S. Pat. No. 8,488,381 are also incorporated herein by reference. The nonvolatile memory 110 is described in reference to, for example, FIGS. 4 to 8.

Although in the following embodiments of the inventive concept the nonvolatile memory 110 is described as being a flash memory device, it will be understood that the inventive concept is not limited only to flash memory devices and is applicable to any types of storage devices (for example, ROM, PROM, EEPROM, flash memory devices, PRAM, MRAM, RRAM, FRAM, and the like).

The nonvolatile memory 110 may include a user area that stores substantial data, and a meta area that stores address mapping information. The user area may store data received from the host 20. The host 20 may transmit data and an address unit (AU) including a plurality of logical addresses corresponding to the data. The meta area of the nonvolatile memory 110 may store mapping information about physical addresses of the user area, in which the data received from the host 20 is substantially stored, and the logical addresses corresponding to the data. Herein, a table including the mapping information of logical addresses and physical addresses stored in the meta area is referred to as a mapping table.

The address sorter 120 may sort the plurality of logical addresses included in the received address unit AU according to a certain rule. For example, the address sorter 120 may sort the plurality of logical addresses included in the address unit AU in ascending or descending order. As will be described later, as the address sorter 120 sorts a plurality of logical addresses, at least a portion of information about the physical addresses allocated to the logical addresses may be omitted to reduce the amount of memory used for the mapping table. Although embodiments of the address sorter 120 sorting a plurality of logical addresses in ascending order are described herein, it will be understood that the inventive concept is not limited thereto, and may include embodiments of sorting in descending order or by any of other certain rules.

Figure 2:
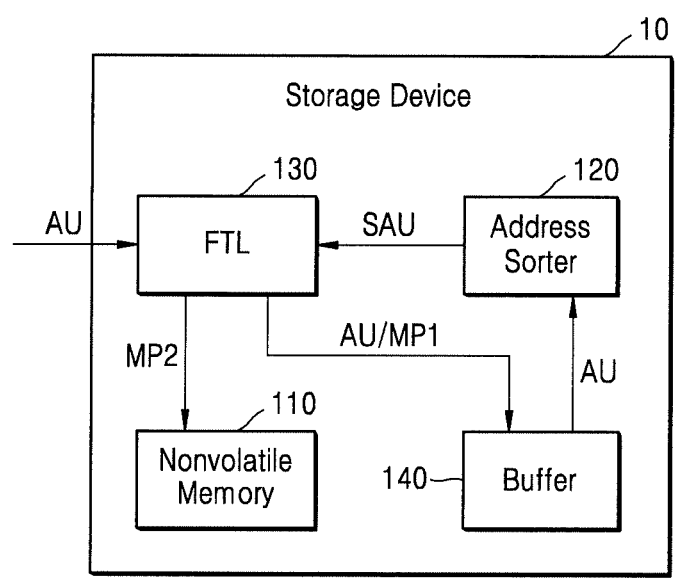
FIG. 2 is a block diagram of a storage device according to an example embodiment of the inventive concept.

FIG. 2 is a block diagram of a storage device 10 according to an example embodiment of the inventive concept. Descriptions of aspects of FIG. 2 overlapping with FIG. 1 may be omitted herein.

Referring to FIG. 2, the storage device 10 may include the nonvolatile memory 110, the address sorter 120, a flash translation layer (FTL) 130, and a buffer 140. Since the nonvolatile memory 110 and the address sorter 120 are described above with reference to FIG. 1, redundant descriptions thereof may not be provided herein.

The FTL 130 may receive an address unit AU from an external source (for example, the host 20 of FIG. 1) and store the received address unit AU in the buffer 140. The FTL 130 may receive a sorted address unit SAU from the address sorter 120 and create a first mapping table (MP1) based on the received sorted address unit SAU. The created first mapping table (MP1) may be stored in the buffer 140. The FTL 130 may create a second mapping table (MP2) based on the first mapping table (MP1). The created second mapping table MP2 may be stored in the nonvolatile memory 110. The FTL 130 may perform these operations independently or by controlling a device controller.

The buffer 140 may include, as a memory capable of writing or reading data at a high speed, a volatile memory, for example, a static random access memory (SRAM), a dynamic random access memory (DRAM), a latch), a flip-flop, or a register; or a nonvolatile memory, such as a NAND flash memory, a vertical NAND (VNAND), a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM). Although, the buffer 140 is described as a DRAM supporting a DRAM interface, it will be understood that the inventive concept is not limited thereto.

The address sorter 120 may read the address unit (AU) from the buffer 140 and create a sorted address unit (SAU) by sorting a plurality of logical addresses included in the address unit (AU). The address sorter 120 may output the sorted address unit SAU to the FTL 130.

In some embodiments of the inventive concept, the FTL 130 may create the first mapping table MP1 including mapping information about all the logical addresses and the physical addresses, and store the first mapping table MP1 in the buffer 140. The FTL 130 may also create the second mapping table MP2 in which information about at least a portion of information about the physical addresses included in the first mapping table MP1 is omitted, and store the second mapping table MP2 in the nonvolatile memory 110. In a case where the buffer 140 is a volatile memory such as a DRAM, the mapping information about the logical addresses and the physical addresses may be lost when the power supply is interrupted. Accordingly, the FTL 130 may store a mapping table including the mapping information about the logical addresses and the physical addresses in the nonvolatile memory 110 that may retain information even when the power supply is interrupted.

In some embodiments of the inventive concept, as the address sorter 120 sorts the logical addresses, the FTL 130 may allocate the physical addresses to the logical addresses according to a certain rule. The FTL 130 may omit at least a portion of information of the physical addresses from the second mapping table MP2 stored in the nonvolatile memory 110. For example, as the address sorter 120 may sort the logical addresses in ascending order and the FTL 130 may sequentially map the physical addresses to the logical addresses, the channel and way information of the physical addresses in the second mapping table MP2 may be omitted, as described for example with reference to FIGS. 7 to 10.

Figure 3:
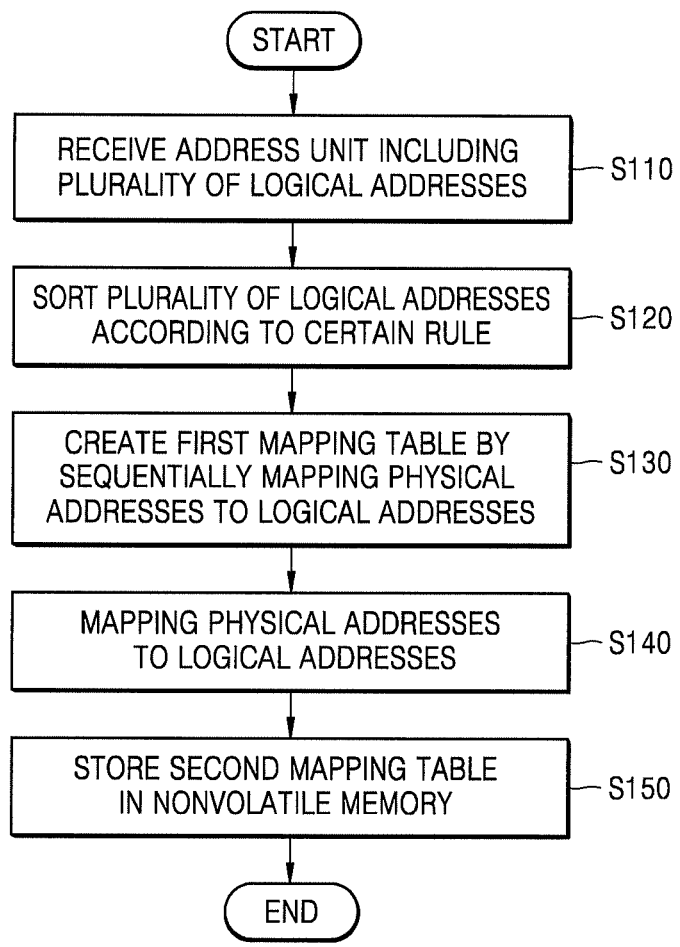
FIG. 3 is a flowchart of an operating method of a storage device, according to an example embodiment of the inventive concept.

FIG. 3 is a flowchart of an operating method of a storage device, according to an embodiment of the inventive concept, and in particular, a method of creating a second mapping table MP2 based on an address unit AU in a storage device according to an embodiment.

Referring to FIGS. 2 and 3, the storage device 10 according to an embodiment may receive an address unit AU including a plurality of logical addresses from an external source (for example, the host 20 of FIG. 1) (S110). The address sorter 120 may sort the plurality of logical addresses included in the address unit AU according to a certain rule (S120). For example, the address sorter 120 may sort the plurality of logical addresses in ascending or descending order.

The FTL 130 may create a first mapping table MP1 by sequentially mapping the physical addresses to the plurality of logical addresses sorted by the address sorter 120 (S130). The FTL 130 may create a second mapping table MP2 based on the first mapping table MP1 (S140). For example, the FTL 130 may create the second mapping table MP2 by omitting at least a portion of information about the physical addresses in the first mapping table MP1. The FTL 130 may store the created second mapping table MP2 in the meta area of the nonvolatile memory 110 (S150).

Figure 4:
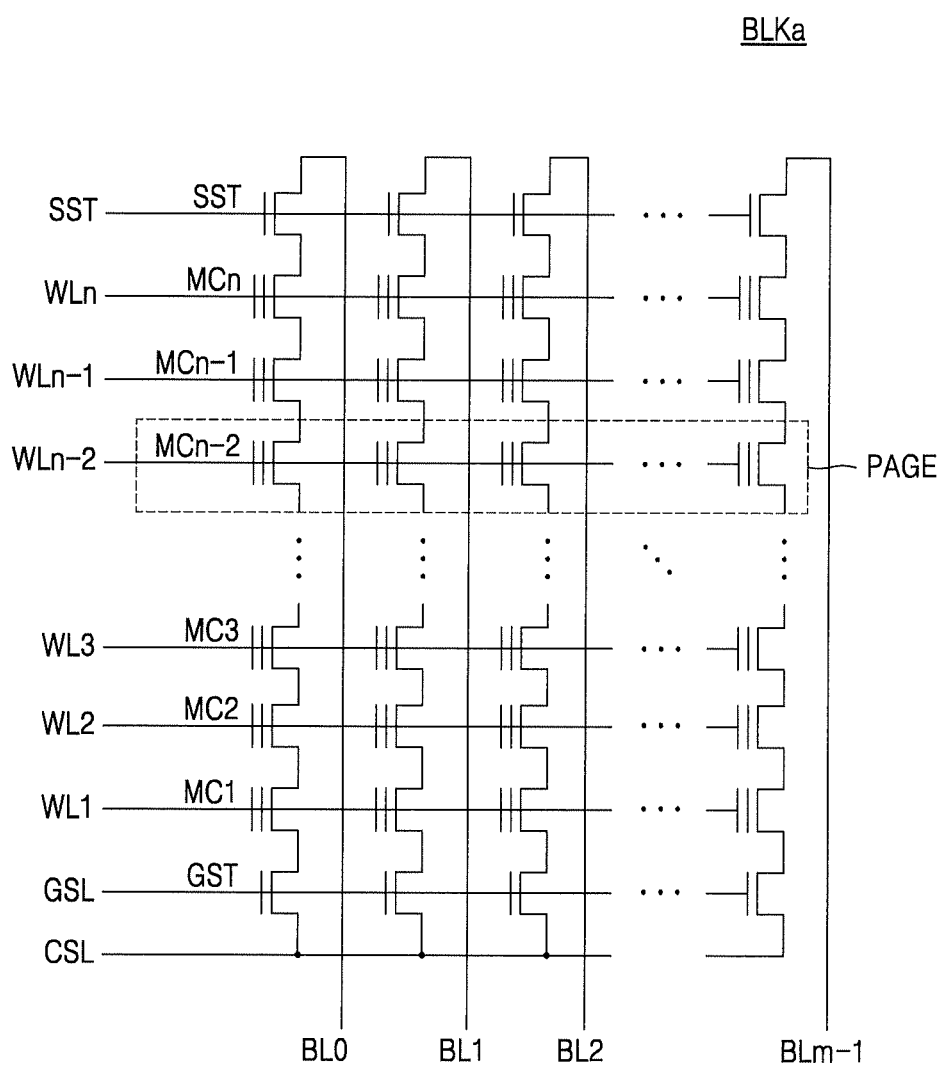
FIG. 4 is a circuit diagram of a memory block included in a nonvolatile memory, according to an example embodiment of the inventive concept.

FIG. 4 is a circuit diagram of a memory block in a nonvolatile memory according to an example embodiment of the inventive concept.

Referring to FIG. 4, a nonvolatile memory according to an embodiment (for example, the nonvolatile memory 110 of FIG. 1) may include a memory cell array of horizontal NAND flash memory, and a plurality of memory blocks. Each memory block BLKa may include n (n is an integer equal to or greater than 2) cell strings in which a plurality of memory cells MC are connected in series in a direction of bit lines BL0 to BLn−1, and pages PAGEs which share word lines WL1 to WLn.

A NAND flash memory device having the structure shown in FIG. 4 may execute erasing on a block basis and may execute a program in page units respectively corresponding to the word lines WL0 to WLn. FIG. 4 shows an example in which n pages for n word lines WL1 to WLn are provided in one memory block BLKa. The nonvolatile memory 110 of FIG. 1 or 2 may include a plurality of memory cell arrays performing the same operation with the same structure as described above.

Figure 5:
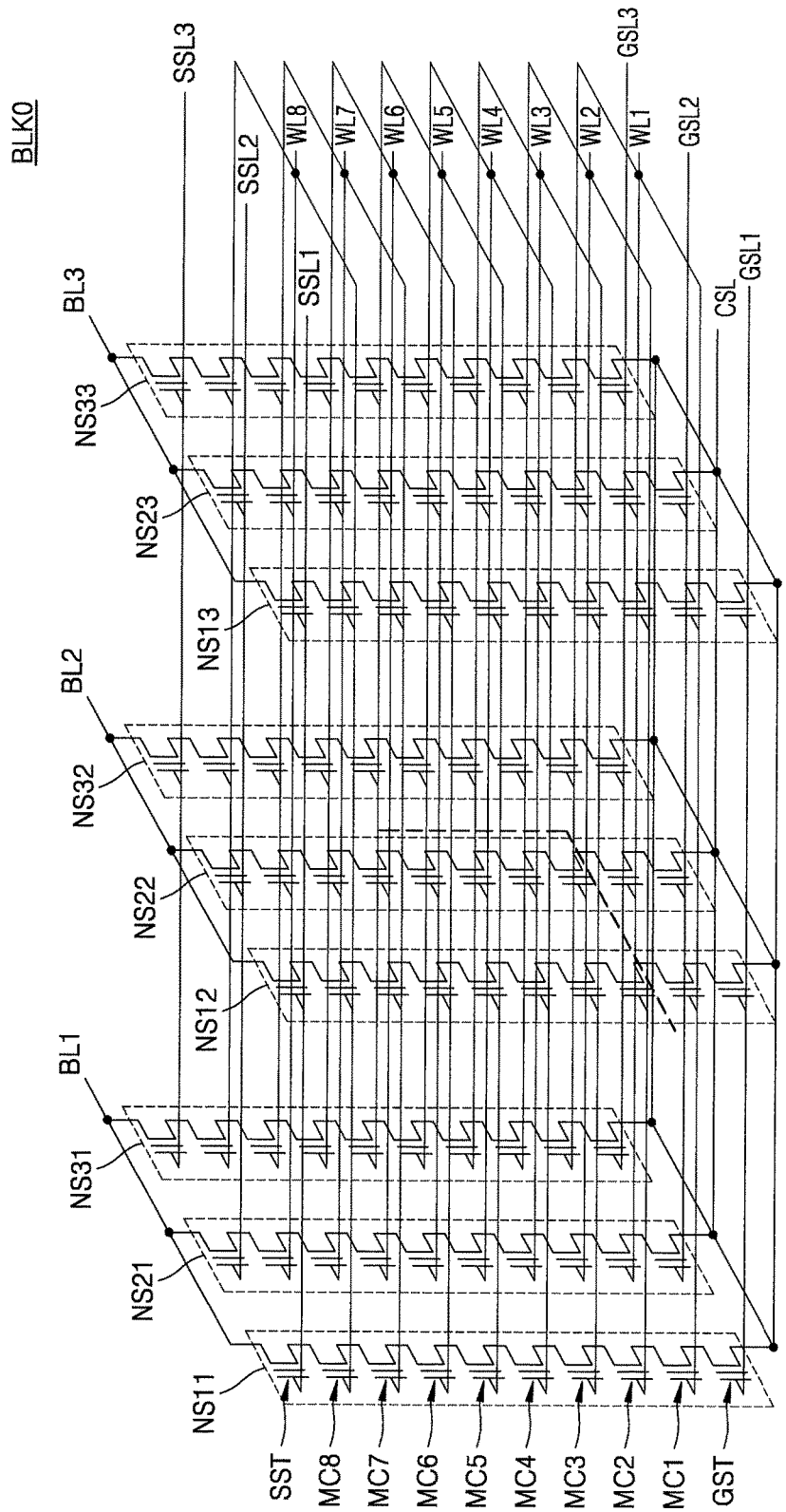
FIG. 5 is a circuit diagram of another example of a memory block included in a memory cell array, according to an example embodiment of the inventive concept.

FIG. 5 is a circuit diagram of another example of a memory block BLK0 included in a memory cell array, according to an example embodiment of the inventive concept.

Referring to FIG. 5, the nonvolatile memory (for example, the nonvolatile memory 110 of FIG. 1) may include a memory cell array of vertical NAND flash memory and a plurality of memory blocks. Each memory block BLK0 may include NAND cell strings NS11 to NS33, a plurality of word lines WL1 to WL8, a plurality of bit lines BL1 to BL3, a plurality of ground selection lines GSL1 to GSL3, a plurality of string selection lines SSL1 to SSL3, and a common source line CSL. The number of the NAND cell strings, the number of the word lines, the number of the bit lines, the number of the ground selection lines, and the number of the cell string selection lines may be variously changed according to embodiments.

The NAND cell strings NS11, NS21 and NS31 may be provided between the first bit line BL1 and the common source line CSL, the NAND cell strings NS12, NS22 and NS32 may be provided between the second bit line BL2 and the common source line CSL, and the NAND cell strings NS13, NS23 and NS33 may be provided between the third bit line BL3 and the common source line CSL. Each NAND cell string (for example, NS11) may include the cell string selection transistor SST, the memory cells MC1 to MC8, and the ground selection transistor GST connected in series.

Cell strings connected in common to a single bit line may constitute one column. For example, the cell strings NS11, NS21, and NS31 connected in common to the first bit line BL1 may correspond to a first column, the cell strings NS12, NS22, and NS32 connected in common to the second bit line BL2 may correspond to a second column, and the cell strings NS13, NS23, and NS33 connected in common to the third bit line BL3 may correspond to a third column.

Cell strings connected in common to a single string selection line may constitute one row. For example, the cell strings NS11, NS12, and NS13 connected to the first cell string selection line SSL1 may correspond to a first row, the cell strings NS21, NS22, and NS23 connected to the second cell string selection line SSL2 may correspond to a second row, and the cell strings NS31, NS32, and NS33 connected to the third cell string selection line SSL3 may correspond to a third row.

A cell string selection transistor SST is connected to a corresponding string selection line among the string selection lines SSL1 to SSL3. A plurality of memory cells MC1 to MC8 are connected to the word lines WL1 to WL8, respectively. A ground selection transistor GST is connected to a corresponding ground selection line among the ground selection lines GSL1 to GSL3. The cell string selection transistor SST is connected to a corresponding bit line among the bit lines BL1 to BL3, and the ground selection transistor GST is connected to the common source line CSL.

Word lines (for example, WL1) having the same height are connected to each other. The cell string selection lines SSL1 to SSL3 are separated from each other, and the ground selection lines GSL1 to GSL3 are also separated from each other. For example, when memory cells which are connected to the first word line WL1 and belong to the cell strings NS11, NS12, and NS13 are programmed, the first word line WL1 and the first cell string selection line SSL1 may be selected. The ground selection lines GSL1 to GSL3 may be commonly connected to each other.

Figure 6:
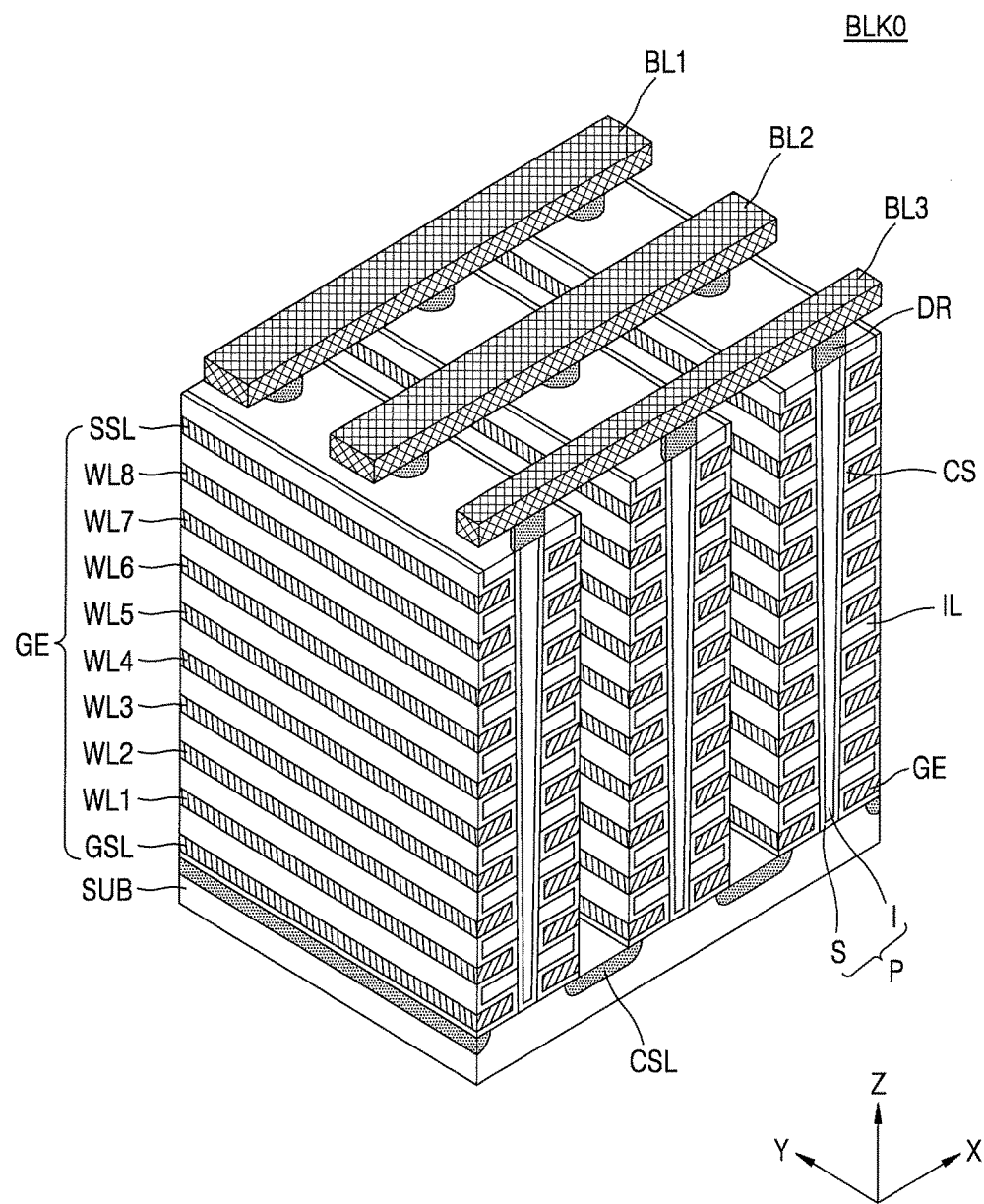
FIG. 6 is a perspective view of the memory block of FIG. 5.

FIG. 6 is a perspective view of the memory block BLK0 of FIG. 5.

Referring to FIG. 6, each memory block included in a nonvolatile memory (for example, nonvolatile memory 110 of FIG. 2)) may be formed in a direction perpendicular to a substrate SUB. Although FIG. 6 shows that a memory block includes two selection lines GSL and SSL, eight word lines WL1 to WL8, and three bit lines BL1 to BL3, each of these elements may be included in a number more or less than these in practice.

The substrate SUB may have a first conductivity type (for example, a p-type) and extend in a first direction (for example, a Y-direction), and the common source line CSL doped with impurities of a second conductivity type (for example, an n-type) may be provided. A plurality of insulating layers IL extending along the first direction may be sequentially provided along a third direction (for example, a Z-direction) in regions of the substrate SUB between two adjacent common source lines CSL. The plurality of insulating layers IL may be spaced apart from each other by a specific distance along the third direction. For example, the plurality of insulating layers IL may include an insulating material such as a silicon oxide.

A plurality of pillars P arranged sequentially in the first direction passing through the plurality of insulating layers IL along the third direction may be provided in the region of the substrate SUB between two adjacent common source lines CSL. For example, the plurality of pillars P may penetrate through the plurality of insulating layers IL to contact the substrate SUB. For example, a surface layer S of each pillar P may include a first type of silicon material and may function as a channel region. An inner layer I of each pillar P may include an insulating material such as a silicon oxide or an air gap.

In the regions between two adjacent common source lines CSL, a charge storage layer CS may be provided along exposed surfaces of the insulating layers IL, the pillars P, and the substrate SUB. The charge storage layer CS may include a gate insulating layer (referred to also as a tunneling insulating layer), a charge trap layer, and a blocking insulating layer. For example, the charge storage layer CS may have an oxide-nitride-oxide (ONO) structure. In addition, in the region between two adjacent common source lines CSL, a gate electrode GE including the selection lines GSL and SSL and the word lines WL1 to WL8 may be provided on an exposed surface of the charge storage layer CS.

Drains or drain contacts DR may be provided on the plurality of pillars P, respectively. For example, the drains or drain contacts DR may include a silicon material doped with impurities of a second conductivity type. The bit lines BL1 to BL3 extending in a second direction (for example, an X-direction) and spaced apart from each other along the first direction by a certain distance may be provided on the drains DR.

Figure 7:
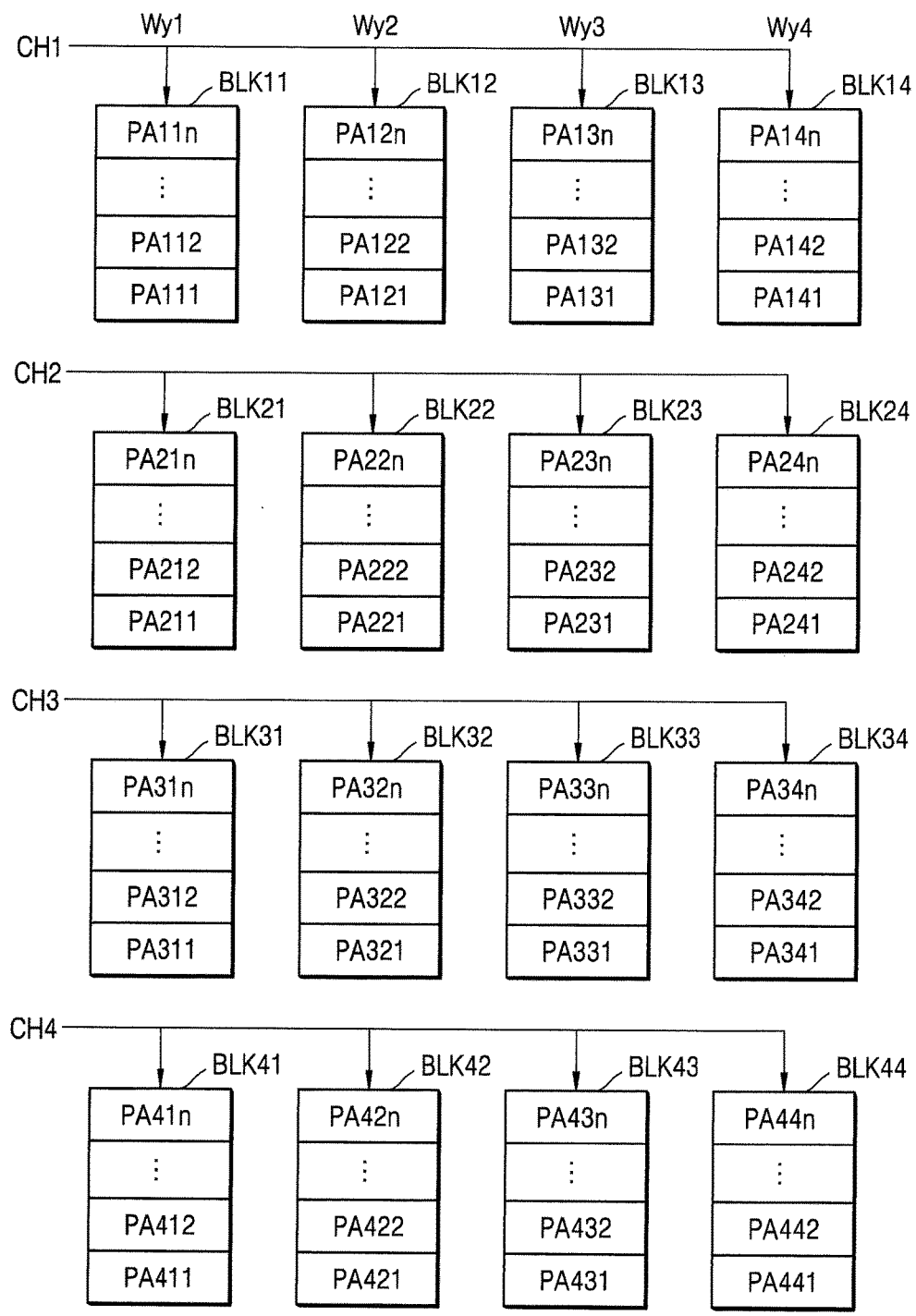
FIG. 7 is a block diagram of a super block according to an embodiment of the inventive concept.

FIG. 7 is a block diagram of a super block according to an embodiment of the inventive concept.

Referring to FIG. 7, a first super block SBLKA may include a plurality of blocks BLK11 to BLK44. Although FIG. 7 shows an embodiment with 16 blocks BLK11 to BLK44, embodiments of the inventive concept are not provided thereto, and the number of blocks may be, for example, greater or less than 16.

Each of the plurality of blocks BLK11 to BLK44 may be a block described above with reference to FIGS. 4 to 6, and may include a plurality of pages. The plurality of blocks BLK11 to BLK44 may be divided according to channels CH1 to CH4 and ways Wy1 to Wy4 connected thereto. For example, a block connected to the second way Wy2 of the second channel CH2 may be a $6^{th}$ block BLK22, and a block connected to the third way Wy3 of the third channel CH3 may be a $11^{th}$ block BLK33.

The plurality of pages included in the plurality of blocks BLK11 to BLK44 may have their own physical addresses PA111 to PA44$n$. The physical addresses PA111 to PA44$n$ may include information about the first super block SBLKA including a corresponding page, information about blocks BLK11 to BLK44, and a page number. The information about the blocks BLK11 to BLK44 may include information about the channels CH1 to CH4 and the ways Wy1 to Wy4 connected to the corresponding blocks BLK11 to BLK44. For example, in a physical address PA321 of the physical addresses PA111 to PA44$n$ according to embodiments disclosed herein, 'A' in 'PA321' may refer to information about the first super block SBLKA including a corresponding page, '32' may refer to information about a $10^{th}$ block BLK32, and '1' may refer to a corresponding page number in the $10^{th}$ block BLK32. In the '32' as information about the $10^{th}$ block BLK32, '3' may refer to information about the third channel CH3 connected to the $10^{th}$ block BLK32, and '2' may refer to information about the second way Wy2 connected to the $10^{th}$ block BLK32. Accordingly, the physical addresses PA111 to PA44$n$ may show the location of a page.

A storage device according to an embodiment may write data to the pages of a same level of the plurality of blocks BLK11 to BLK44 and then sequentially to other pages of other levels in the same manner. That is, the storage device may sequentially write data to the pages PA111 to PA441 having a page number of 1 of a first level of the plurality of blocks BLK11 to BLK44, and then to the pages PA112 to PA442 having a page number of 2 of a second level of the plurality of blocks BLK11 to BLK44. This manner of sequentially writing data to the pages of the same levels of a plurality of blocks is herein referred to as a parallel writing method. It will be understood, however, that the inventive concept is not limited to sequential allocation. For example, in some embodiments, the allocation can be done in any deterministic way that allows for no variation in the allocation so that omitted information may be recovered without any loss of information.

Figure 8:
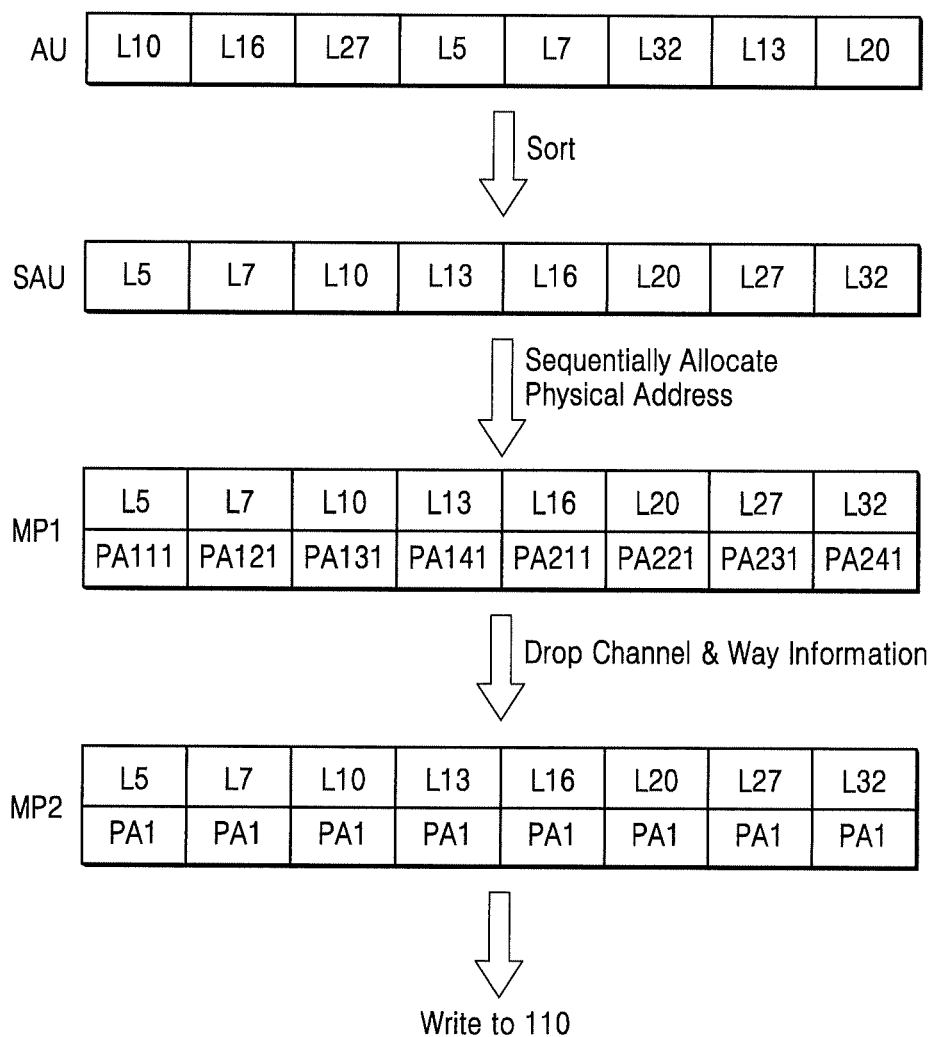
FIG. 8 is a diagram for explaining an operating method of a storage device, according to an example embodiment of the inventive concept.

FIG. 8 is a diagram for explaining an operating method of a storage device, according to an example embodiment of the inventive concept, and in particular, a method of creating a second mapping table MP2 in a storage device by using an address unit AU, according to an embodiment.

Referring to FIGS. 2, 7, and 8, the storage device 10 may receive an address unit AU including a plurality of logical addresses from an external source (for example, the host 20 of FIG. 1). The address sorter 120 may sort the plurality of logical addresses included in the address unit AU in ascending order to create a sorted address unit SAU. That is, the address sorter 120 may create a sorted address unit SAU by sorting logical addresses 'L10, L16, L27, L5, L7, L32, L13, and L20' in ascending order, i.e., in the order of 'L5, L7, L10, L13, L16, L20, L27, and L32.'

The FTL 130 may create a first mapping table MP1 by sequentially allocating physical addresses to the sorted address unit SAU. According to FIG. 7 and the parallel writing method as described above, physical addresses corresponding to the pages PA111 to PA441 at the first level may be sequentially allocated. That is, the physical addresses of the pages 'PA111 to PA241' may be allocated according to the order of sorted logical addresses 'L5, L7, L10, L13, L16, L20, L27, and L32' of the sorted address unit SAU. The FTL 130 may store the first mapping table MP1 in the buffer 140 independently or by controlling a device controller.

The FTL 130 may create a second mapping table MP2 by omitting the information about the channels CH1 to CH4 and the ways Wy1 to Wy4 from the physical addresses of the first mapping table MP1. That is, the FTL 130 may create the second mapping table MP2 by omitting the information about the channels CH1 to CH4 and the ways Wy1 to Wy4, i.e., '11' to '24,' from the physical addresses 'PA111 to PA241' in the first mapping table MP1 and leaving only 'A' as information of the super block and '1' as information of the page number. Accordingly, the physical addresses in the second mapping table MP2 may have a reduced data amount compared to that of the physical addresses of the first mapping table MP1. The FTL 130 may store the second mapping table MP2 in the nonvolatile memory 110 independently or by controlling a device controller.

In some embodiments according to the inventive concept, the storage device 10 may sort logical addresses of the address unit AU and sequentially allocate physical addresses to the sorted logical addresses, and may create a second mapping table MP2 while omitting at least a portion of information about the physical addresses. Accordingly, the second mapping table MP2 may have a reduced data amount, and a storage space of the nonvolatile memory 110 for the second mapping table MP2 may be saved.

Figure 9:
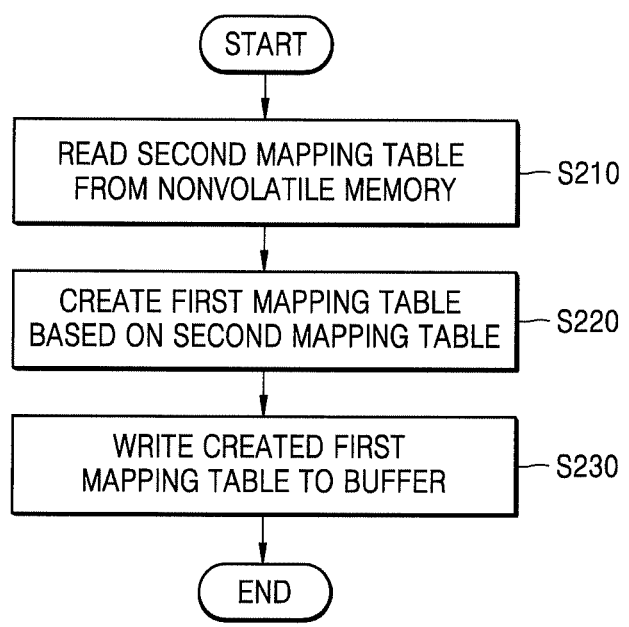
FIG. 9 is a flowchart of an operating method of a storage device, according to an example embodiment of the inventive concept.

FIG. 9 is a flowchart of an operating method of a storage device, according to an example embodiment of the inventive concept, and in particular, a method of creating a first mapping table MP1 from a second mapping table MP2 in a storage device according to an embodiment.

Referring to FIG. 2 and FIG. 9, the FTL 130 may read a second mapping table MP2 from the nonvolatile memory 110 independently or by controlling a device controller (S210). The FTL 130 may create a first mapping table MP1 based on the second mapping table MP2 (S220). In some embodiments of the inventive concept, the FTL 130 may create the first mapping table MP1 by adding channel and way information to the physical addresses included in the second mapping table MP2 according to a certain rule. In some embodiments, the FTL 130 may create the first mapping table MP1 by sequentially adding the channel and way information to the physical addresses. The FTL 130 may write the created first mapping table MP1 to the buffer 140 independently or by controlling the device controller (S230). The storage device 10 may process a command from a host (for example, the host 20 of FIG. 1) at a high speed using the first mapping table MP1 written to the buffer 140.

Figure 10:
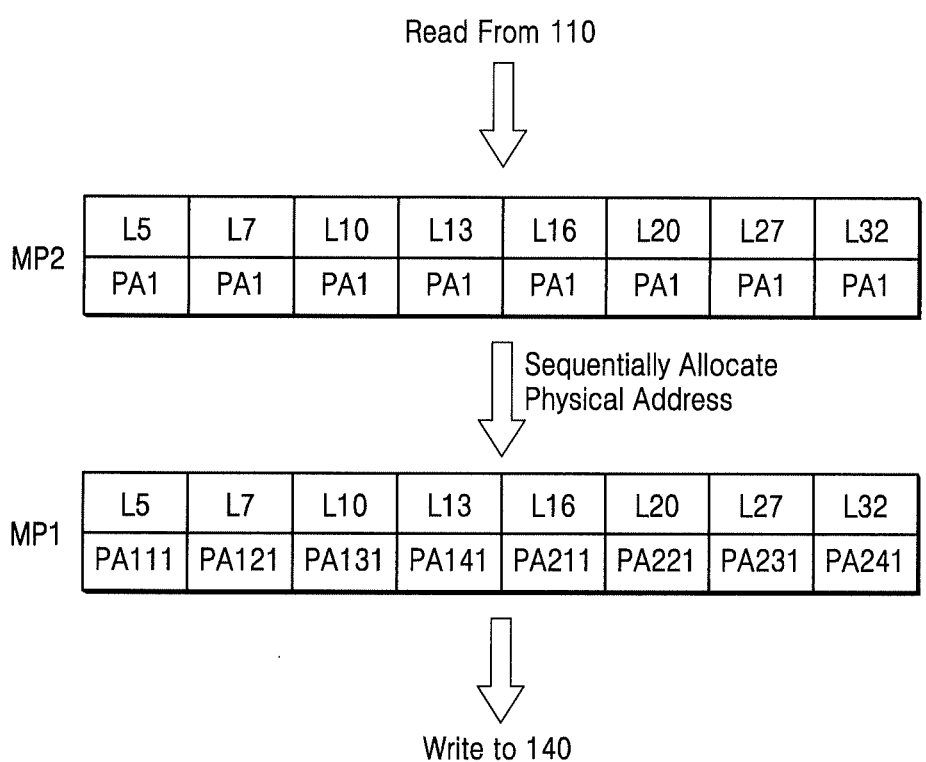
FIG. 10 is a diagram for explaining an operating method of a storage device, according to an example embodiment of the inventive concept.

FIG. 10 is a diagram for explaining an operating method of a storage device, according to an example embodiment of the inventive concept, and in particular, a method of creating a first mapping table MP1 with a second mapping table MP2 in a storage device according to an embodiment.

Referring to FIGS. 2, 7, and 10, the FTL 130 may read the second mapping table MP2 from the nonvolatile memory 110 independently or by controlling a device controller. As described above with reference to FIG. 8, in the second mapping table MP2, the logical addresses may be sequentially stored while at least a portion of information about the channels CH1 to CH4 and the ways Wy1 to Wy4 is omitted from the physical addresses. The FTL 130 may sequentially allocate the channels CH1 to CH4 and the ways Wy1 to Wy4 based on the physical addresses included in the second mapping table MP2. That is, the FTL 130 may sequentially add information about the channels CH1 to CH4 and the ways Wy1 to Wy4 to the physical addresses PA1, PA1, PA1, PA1, PA1, PA1, PA1, and PA1 corresponding to the logical addresses L5, L7, L10, L13, L16, L20, L27, and L32. The FTL 130 may sequentially allocate the channels CH1 to CH4 and the ways Wy1 to Wy4 in order according to a parallel writing method as described above with reference to FIG. 7.

For example, as illustrated in FIG. 10, a physical address of 'PA111,' which corresponds to a channel and a way of a $1^{st}$ block to which data will be written firstly according to a parallel writing method, selected from the channels CH1 to CH4 and from the ways Wy1 to Wy4, respectively, may be allocated to a first smallest logical address of 'L5' of the second mapping table MP2. Then, a physical address of 'PA121,' which corresponds to a channel and a way of a $2^{nd}$ block to which data will be written secondly according to a parallel writing method, selected from the channels CH1 to CH4 and from the ways Wy1 to Wy4, respectively, may be allocated to a second smallest logical address of 'L7' of the second mapping table MP2. In this manner, a physical address of 'PA131' may be allocated to a logical address of 'L10,' a physical address of 'PA141' to a logical address of 'L13,' a physical address of 'PA211' to a logical address of 'L16,' a physical address of 'PA221' to a logical address of 'L20,' a physical address of 'PA231' to a logical address of 'L27,' and then a physical address of 'PA241' to a logical address of 'L32.' The FTL 130 may create a first mapping table MP1 by allocating physical addresses to the logical addresses of the second mapping table MP2 in the manner as described above.

The FTL 130 may store the created first mapping table MP1 in the buffer 140. The storage device 10 may process a command from a host (for example, the host 20 of FIG. 1) at a high speed using the first mapping storage device 10 stored in the buffer 140.

Figure 11:
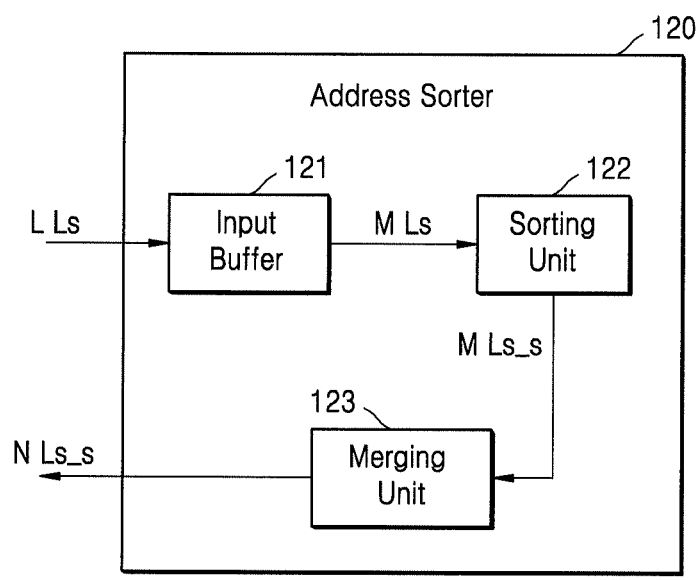
FIG. 11 is a block diagram of an address sorter according to an example embodiment of the inventive concept.

FIG. 11 is a block diagram of an address sorter according to an example embodiment of the inventive concept.

Referring to FIGS. 2 and 11, the address sorter 120 according to an embodiment may include an input buffer 121, a sorting unit 122, and a merging unit 123. The address sorter 120 may read L logical addresses (represented as L Ls in FIG. 11, wherein L is a natural number greater than 1 indicating the number of logical addresses) from the buffer 140 and store the logical addresses in the input buffer 121.

The input buffer 121 as a memory capable of writing or reading data at a higher speed than the nonvolatile memory 110, may include, for example, a volatile memory such as a static random access memory (SRAM), a dynamic random access memory (DRAM), a latch, a flip-flop, or a register. For example, the input buffer 121 may include a nonvolatile memory (that is faster than the nonvolatile memory 110) such as a NAND flash memory, a vertical NAND flash memory (VNAND), a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM). Hereinafter, for convenience of explanation, the input buffer 121 is described as an SRAM, however, embodiments of the inventive concept are not limited thereto.

The sorting unit 122 may read M logical addresses (represented as M Ls in FIG. 11, wherein M is a natural number greater than 1 and smaller than L) among the L logical addresses from the input buffer 121 and sort the read M logical addresses. In some embodiments of the inventive concept, the sorting unit 122 may sort the M logical addresses in ascending or descending order. The sorting unit 122 may store the sorted M logical address (represented as M Ls_s in FIG. 11) in the merging unit 123. To this end, the merging unit 123 may include at least one storage space such as a stack, queue, SRAM, or DRAM.

When the sorting of the M logical addresses (M Ls) is completed, the sorting unit 122 may read other M logical addresses from the input buffer 121 and sort the read M logical addresses. When all the L logical address (L Ls) are completely sorted through repetitions of the above-described operations, the address sorter 120 may read other L logical addresses from the buffer 140 and store the read L logical addresses in the input buffer 121. Then, the sorting unit 122 may sort the L logical addresses stored in the input buffer 121 in a manner as described above and store the sorted L logical addresses in the merging unit 123.

When the number of the logical addresses stored in the merging unit 123 by the sorting unit 122 is equal to or greater than N (wherein N is a natural number greater than or equal to L), the merging unit 123 may output the sorted N logical address (represented as N Ls_s in FIG. 11) to the FTL 130. The FTL 130 may create a first mapping table MP1 and a second mapping table MP2 using the N logical addresses (N Ls_s) sorted in the above-described manner.

Figure 12:
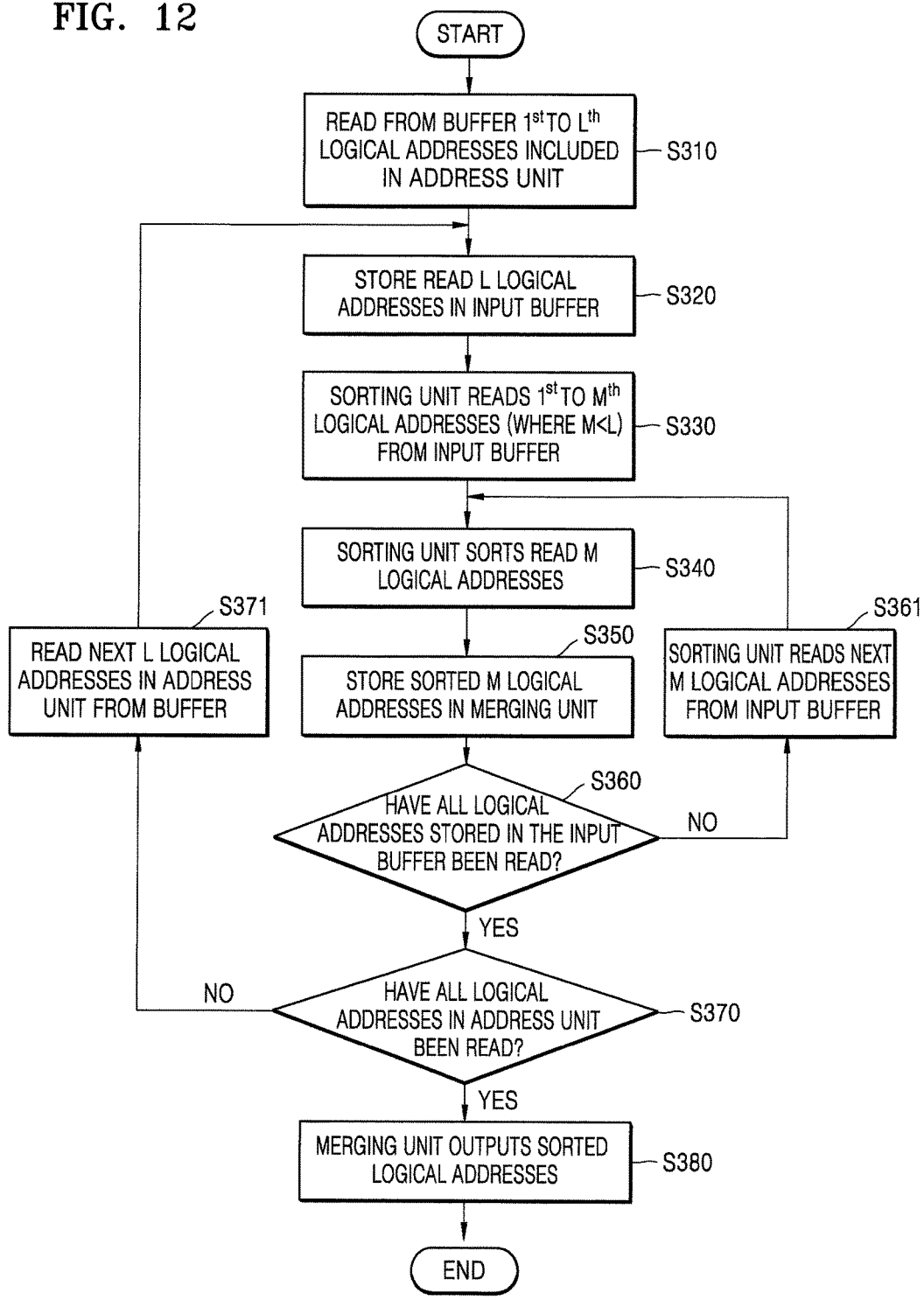
FIG. 12 is a flowchart of an operating method of an address sorter, according to an example embodiment of the inventive concept.

FIG. 12 is a flowchart of an operating method of an address sorter, according to an example embodiment of the inventive concept.

Referring to FIGS. 2, 11, and 12, the address sorter 120 according to an embodiment may read $1^{st}$ to $L^{th}$ logical addresses (wherein L is a natural number greater than 1) included in an address unit AU from the buffer 140 (S310). The address sorter 120 may store the read L logical addresses (L Ls) in the input buffer 121 (S320). The sorting unit 122 may read the $1^{st}$ to $M^{th}$ logical addresses (wherein M is a natural number greater than 1) of the $1^{st}$ to $L^{th}$ logical addresses (S330). The sorting unit 122 may sort the read M logical addresses (represented as M Ls in FIG. 11) (S340). In some embodiments of the inventive concept, the sorting unit 122 may sort the read M logical addresses in ascending or descending order. The sorting unit 122 may store the sorted M logical address (represented as M Ls_s in FIG. 11) in the merging unit 123 (S350).

The address sorter 120 may determine whether all of the L logical addresses (represented as L Ls in FIG. 11) stored in the input buffer 121 have been read (S360). When all of the L logical addresses stored in the input buffer 121 have not been read yet, the sorting unit 122 may then read M logical addresses (represented as M Ls in FIG. 11) from among the remaining logical addresses not read yet from the input buffer 121 (S361), sort the read M logical addresses (S340), and then store the sorted M logical addresses in the merging unit 123 (S350).

When all of the L logical addresses stored in the input buffer 121 are read, the address sorter 120 may determine whether all of the logical addresses in the address unit AU have been read from the buffer 140 (S370). When all of the logical addresses in the address unit AU have not been read yet, the address sorter 120 may read next L logical addresses remaining not read yet in the address unit AU from the buffer 140 (S371). The address sorter 120 may sort the read L logical addresses and store the sorted L logical addresses in the merging unit 123 (S320 to S360). When all of the logical addresses of the address unit AU are completely read, the merging unit 123 may output the sorted logical addresses to the FTL 130 (S380).

As represented in FIG. 12, by repeatedly reading and sorting L logical addresses in the address unit AU stored in the buffer 140, the address sorter 120 may efficiently sort the address unit AU. In some embodiments, the address sorter 120 may sort the address unit AU according to a sort command from the FTL 130.

Figure 13:
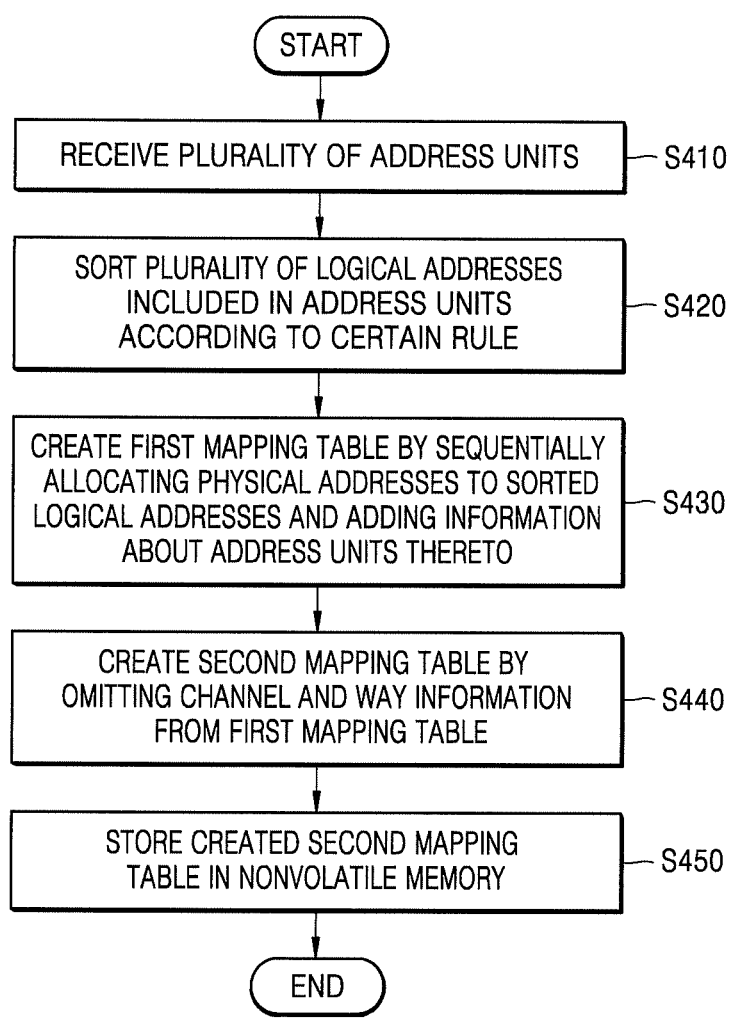
FIG. 13 is a flowchart of an operating method of a storage device, according to an example embodiment of the inventive concept.

FIG. 13 is a flowchart of an operating method of a storage device, according to an example embodiment of the inventive concept, and in particular, an operating method of a storage device when a plurality of address units are received in a storage device according to an embodiment from a host.

Referring to FIGS. 2 and 13, the storage device 10 according to an embodiment may receive a plurality of address units AUs from a host (for example, the host 20 of FIG. 1) (S410). In some embodiments, the host may execute multiple threads. The host may simultaneously output the plurality of address units AUs to the storage device 10 through the multiple threads.

The address sorter 120 may sort the plurality of logical addresses included in the address units AUs according to a certain rule (S420). In some embodiments of the inventive concept, the address sorter 120 may sort the plurality of logical addresses in ascending or descending order. The FTL 130 may create a first mapping table MP1 by sequentially allocating physical addresses to the sorted plurality of logical addresses and adding information about the address units AUs thereto (S430). The FTL 130 may create a second mapping table MP2 by omitting the channel and way information from the first mapping table MP1 (S440). The FTL 130 may store the created second mapping table MP2 in the nonvolatile memory 110.

The received plurality of address units AUs may be simultaneously written to the nonvolatile memory 110 and managed, but may be read one by one. Accordingly, when a plurality of address units AUs are separately received through the multiple threads, respectively, from the host, the storage device 10 may save storage space in the meta area of the nonvolatile device for the second mapping table MP2 by adding information about the address units AUs to the physical addresses and omitting the channel and way information. By adding the information about the plurality of address units AUs to the physical addresses of the second mapping table MP2, the storage device 10 may efficiently manage the mapping tables of the plurality of address units AUs.

Figure 14:
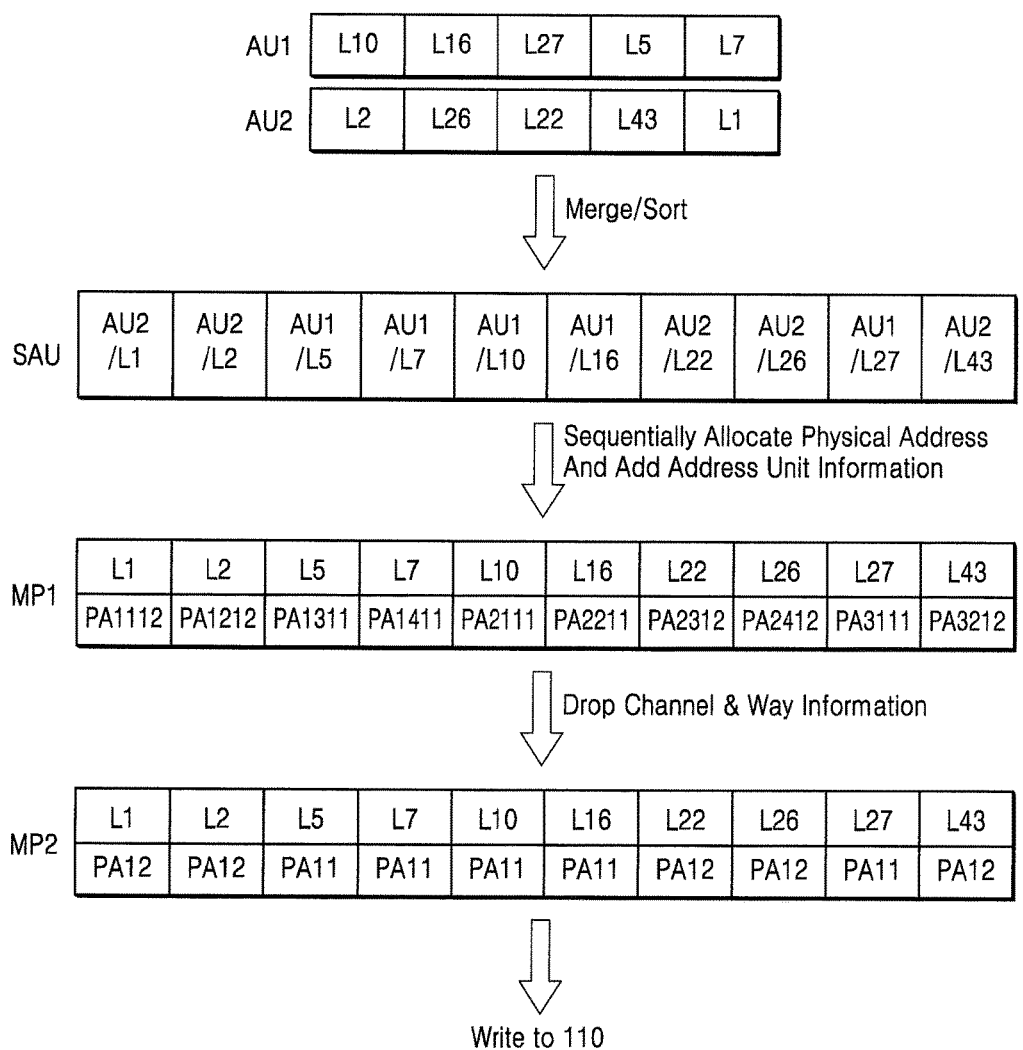
FIG. 14 is a diagram for explaining an operating method of a storage device, according to an example embodiment of the inventive concept.

FIG. 14 is a diagram for explaining an operating method of a storage device, according to an example embodiment of the inventive concept, and in particular, an operating method of a storage device according to an embodiment when a plurality of address units are received from a host.

Referring to FIGS. 2 and 14, the storage device 10 according to an embodiment may receive a first address unit AU1 and a second address unit AU2 from a host (for example, the host 20 of FIG. 1). The address sorter 120 may merge the received first address unit AU1 and second address unit AU2 and sort logical addresses in them according to a certain rule to generate a sorted address unit SAU. FIG. 14 illustrates an embodiment of the address sorter 120 sorting the logical addresses of the first address unit AU1 and the second address unit AU2 in ascending order. However, embodiments of the inventive concept are not limited thereto.

The address sorter 120 may incorporate identification information of the first address unit AU1 and the second address unit AU2 into the sorted address unit SAU. That is, 'L10, L16, L27, L5, and L7' as logical addresses included in the first address unit AU1 may include 'AU1' as the identification information of the first address unit AU1, and 'L2, L26, L22, L43, and L1' as logical addresses included in the second address unit AU2 may include 'AU2' as the identification information of the second address unit AU2. Accordingly, the address sorter 120 may create the sorted address unit SAU including the sorted logical addresses with the identification information of the first address unit AU1 or the second address unit AU2, i.e., 'AU2/L1, AU2/L2, AU1/L5, AU1/L7, AU1/L10, AU1/L16, AU2/L22, AU2/L26, AU1/L27, and AU2/L43.' The address sorter 120 may output the sorted address unit SAU to the FTL 130.

The FTL 130 may create a first mapping table using the received sorted address unit SAU. In particular, the FTL 130 may create a first mapping table MP1 by sequentially allocating physical addresses to the logical addresses and adding information of the address unit AU thereto. In the embodiment of FIG. 14, the FTL 130 may allocate 'PA1112' to 'AU2/L1' by mapping 'PA111' to 'AU2/L1' in an order according to a parallel writing method described above with reference to FIG. 8, and by adding '2' as the information of the corresponding second address unit AU2 to 'PA111.' The FTL 130 may allocate 'PA1212' to 'AU2/L2' in the same manner by mapping 'PA121' to 'AU2/L2' in an order according to a parallel writing method described above, and by adding '2' as the information of the corresponding second address unit AU2 to 'PA121.' In the same manner, the FTL 130 may allocate 'PA1311' to 'AU1/L5,' 'PA1411' to 'AU1/L7,' 'PA2111' to 'AU1/L10,' 'PA2211' to 'AU1/L16,' 'PA2312' to 'AU2/L22,' 'PA2412' to 'AU2/L26,' 'PA3111' to 'AU1/L27,' and 'PA3212' to 'AU2/L43.'

The FTL 130 may create a second mapping table MP2 using the first mapping table MP1. In particular, the FTL 130 may create a second mapping table MP2 by omitting the channel and way information from the physical addresses of the first mapping table MP1. As described above with reference to FIG. 8, the first number in each physical address may be channel information and the second-appearing number may be way information. In the embodiment of FIG. 14, the FTL 130 may omit '11,' the channel and way information, from 'PA1112' to allocate 'PA12' to the physical address corresponding to the logical address 'L1.' In the same manner, the FTL 130 may allocate 'PA12' to 'L2,' 'PA11' to 'L5,' 'PA11' to 'L7,' 'PA11' to 'L10,' 'PA11' to 'L16,' 'PA12' to 'L22,' 'PA12' to 'L26,' 'PA11' to 'L27,' and 'PA12' to 'L43.' That is, in some embodiments of the inventive concept, the storage device 10 may create a second mapping table MP2 by using only super block information (for example, 'A'), page number information (for example, '1'), and identification information of the address unit AU (for example, '1' or '2') in the physical addresses corresponding to logical addresses, and store the created second mapping table MP2 in the nonvolatile memory 110. Accordingly, a storage space in the meta area of the nonvolatile memory 110 for storing the second mapping table MP2 may be saved.

Figure 15:
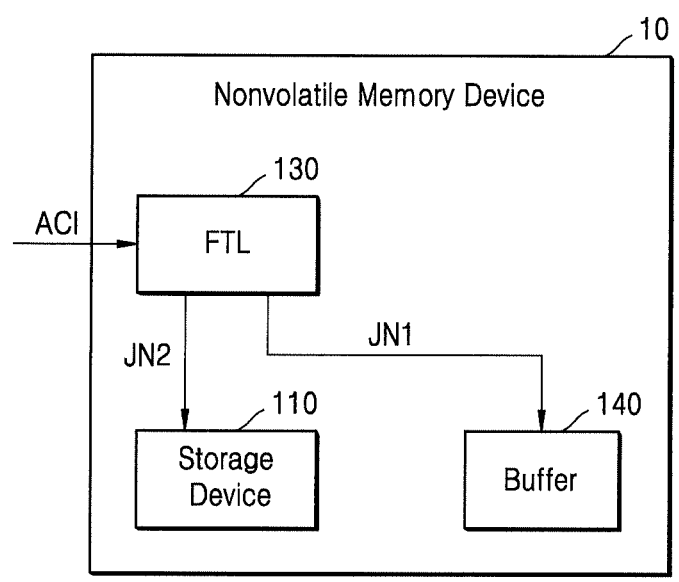
FIG. 15 is a block diagram of a storage device according to an example embodiment of the inventive concept.

FIG. 15 is a block diagram of a storage device according to an example embodiment of the inventive concept, in particular, when an address change request is received from an external source. Overlapping content with FIG. 2 may be omitted.

Referring to FIG. 15, a storage device 10 according to an embodiment may include a nonvolatile memory 110, a FTL 130, and a buffer 140. When there is a need to change data stored in the nonvolatile memory 110, a host (for example, the host 20 of FIG. 1) may output address change information ACI to the FTL 130 together with an address change request. The address change information ACI may include logical address change information about a logical address to change in a mapping table stored in the storage device 10. In other words, the address change information ACI may include logical address change information about a logical address to change having a physical address allocated thereto. A logical address to change according to the address change information ACI may also herein be referred to as a changing logical address. When there is a request to change a logical address with a physical address allocated thereto, the change in the storage device 10 may not be reflected immediately or at the same time as other requests. Accordingly, the storage device 10 may collect requested changes before reflecting the requested changes. A collection of requested changes may be referred to as a journal. To prevent loss of a journal when the power is interrupted, the storage device 10 may store the journal in the nonvolatile memory 110.

The FTL 130 may generate a first journal JN1 based on the received address change information ACI. In some embodiments of the inventive concept, the FTL 130 may generate a first journal JN1 by sequentially allocating the physical addresses to the changing logical addresses included in the address change information ACI. In particular, the FTL 130 may generate the first journal JN1 by allocating the physical addresses to the changing logical addresses included in the address change information ACI in an order according to a parallel writing method. The FTL 130 may store the first journal JN1 in the buffer 140 independently or by controlling a device controller. When an access request to the changing logical addresses included in the first journal JN1 is received from a host (for example, the host 20 of FIG. 1), the storage device 10 may respond to the access request with the first journal JN1, not the mapping table stored in the buffer 140 or the nonvolatile memory 110.

The FTL 130 may generate a second journal JN2 based on the first journal JN1. In some embodiments of the inventive concept, the FTL 130 may generate the second journal JN2 by omitting the remaining physical addresses except for a first physical address corresponding to a first changing logical address from the first journal JN1 and replacing the first physical address with a physical address including information about the number of changing physical addresses. The FTL 130 may also store the generated second journal JN2 in the nonvolatile memory 110. Since the physical addresses are sequentially allocated to the changing local addresses included in the first journal JN1 as described above, it may be possible to restore the remaining physical addresses as long as the first physical address is known. Accordingly, it may be possible to omit the remaining restorable physical addresses except for the first physical address. According to the inventive concept of the present disclosure, the remaining physical addresses except for the first physical address may be omitted in the second journal JN2, so that the second journal JN2 may have reduced data amount, and a storage space in the nonvolatile memory 110 for storing the second journal JN2 may be saved.

Figure 16:
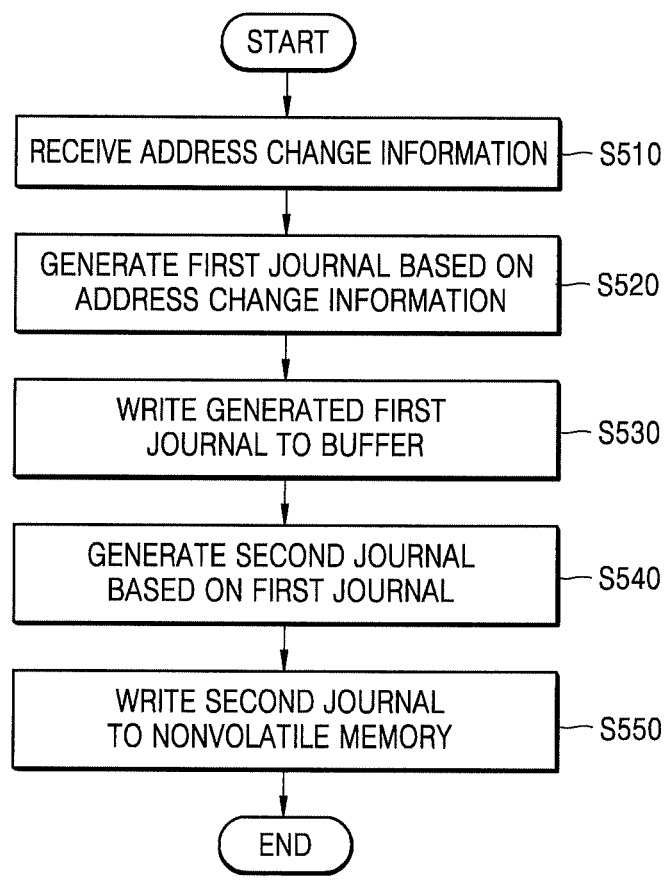
FIG. 16 is a flowchart of an operating method of a storage device, according to an embodiment of the inventive concept.

FIG. 16 is a flowchart of an operating method of a storage device, according to an embodiment of the inventive concept, and in particular, an operating method of a storage device according to an embodiment when an address change request is received from an external source.

Referring to FIGS. 15 and 16, the storage device 10 according to an embodiment may receive address change information ACI from an external source (for example, the host 20 of FIG. 1) (S510). The FTL 130 may generate a first journal JN1 based on the received address change information ACI (S520). The FTL 130 may write the generated first journal JN1 to the buffer 140 independently or by controlling a device controller (S530). The FTL 130 may generate a second journal JN2 based on the first journal JN1 (S540). In some embodiments of the inventive concept, the FTL 130 may generate the second journal JN2 by omitting the remaining physical addresses except for a first physical address corresponding to a first changing logical address from the first journal JN1 and replacing the first physical address with a physical address including information about the number of changing physical addresses. The FTL 130 may write the generated second journal JN2 to the nonvolatile memory 110 independently or by controlling a device controller (S550).

Figure 17:
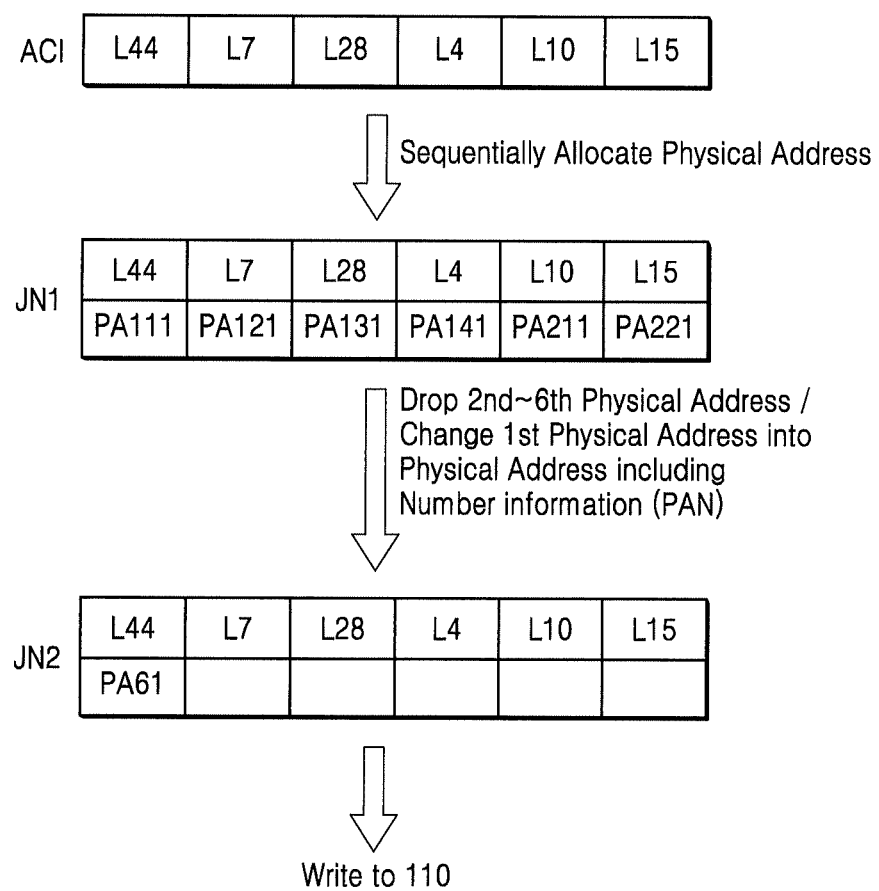
FIG. 17 is a diagram for explaining an operating method of a storage device, according to an embodiment of the inventive concept.

FIG. 17 is a diagram for explaining an operating method of a storage device, according to an embodiment of the inventive concept, and in particular, an operating method of a storage device according to an embodiment when an address change request is received from an external source.

Referring to FIGS. 15 and 17, the storage device 10 may receive address change information ACI including logical addresses 'L44, L7, L28, L4, L10, and L15' from a host (for example, the host 20 of FIG. 1). The FTL 130 may generate a first journal JN1 by sequentially allocating physical addresses to the logical addresses 'L44, L7, L28, L4, L10, and L15' included in the received address change information ACI according to a parallel writing method. Accordingly, in the embodiment illustrated in FIG. 17, 'PA111, PA121, PA131, PA141, PA211, and PA221' may be sequentially allocated to 'L44, L7, L28, L4, L10, and L15,' respectively.

The FTL 130 may generate a second journal JN2 by omitting the remaining physical addresses except for a first physical address corresponding to a first changing logical address from the first journal JN1 and replacing the first physical address with a physical address PAN including information about the number of changing physical addresses. In the embodiment of FIG. 17, the second journal JN2 may be generated by omitting the physical addresses 'PA121, PA131, PA141, PA211, and PA221,' except for the physical address 'PA111' corresponding to the first changing logical address 'L44,' and replacing the first physical address 'PA111' with 'PA61,' a physical address PAN including '6' indicating the number of changing logical addresses. The physical address 'PA61' may be a physical address obtained by omitting '11,' which is channel and way information, from the first physical address 'PA111,' and adding '6' indicating the number of changing logical addresses thereto.

The FTL 130 may store the generated second journal JN2 in the nonvolatile memory 110. According to the inventive concept of the present disclosure, the remaining physical addresses except for the first physical address may be omitted in the second journal JN2, so that the second journal JN2 may have reduced data amount, and a storage space in the nonvolatile memory 110 for storing the second journal JN2 may be saved.

Figure 18:
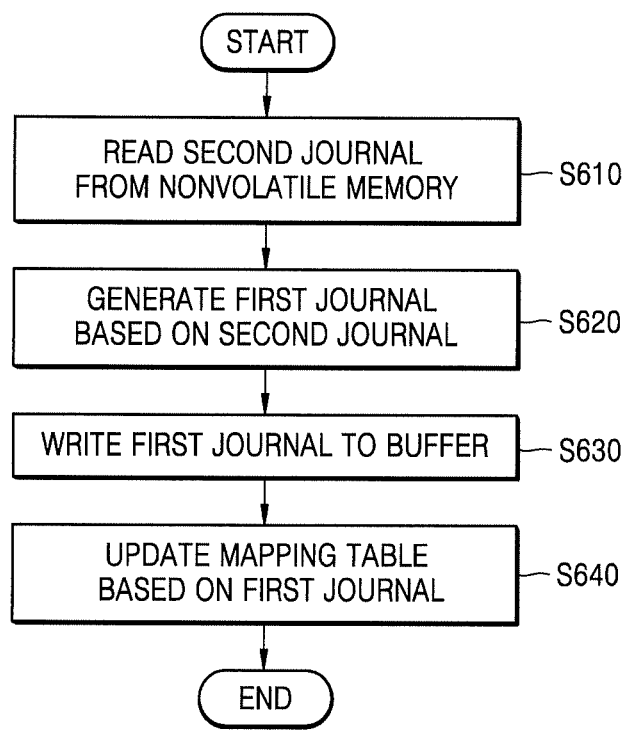
FIG. 18 is a flowchart of an operating method of a storage device, according to an example embodiment of the inventive concept.

FIG. 18 is a flowchart of an operating method of a storage device, according to an example embodiment of the inventive concept, and in particular, a method of generating a first journal JN1 using a second journal JN2 in a storage device according to an embodiment of the inventive concept.

Referring to FIGS. 15 and 18, the FTL 130 may read a second journal JN2 from the nonvolatile memory 110 (S610), and generate a first journal JN1 based on the second journal JN2 (S620). In some embodiments of the inventive concept, the FTL 130 may restore the first physical address of the first journal JN1 based on super block information and page number information included in the first physical address of the second journal JN2, and restore the remaining physical addresses based on the information about the number of changing logical addresses included in the first physical address of the second journal JN2. The FTL 130 may determine the first physical address of the first journal JN1 by adding the channel and way information of the 1$^{st}$ block to which data will be written firstly to the first physical address of the second journal JN2 and determine the remaining physical addresses of the first journal JN1 by allocating as many physical addresses as the number of changing logical addresses included in the first physical address of the second journal JN2 in an order according to a parallel writing method.

The FTL 130 may write the generated first journal JN1 to the buffer 140 (S630) and update the previously stored mapping table based on the written first journal JN1 (S640).

Figure 19:
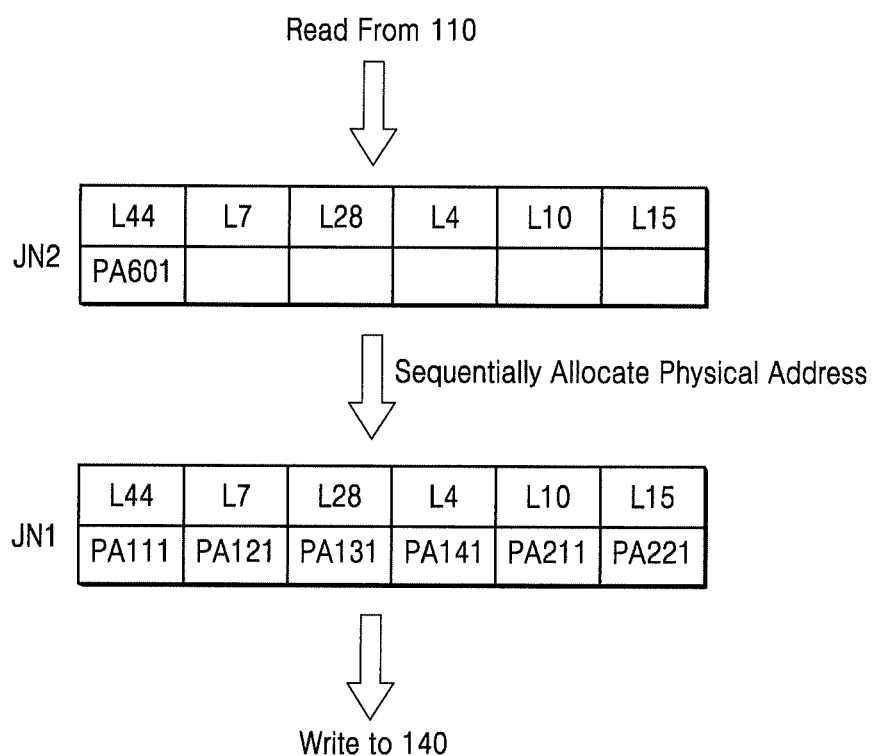
FIG. 19 is a diagram for explaining an operating method of a storage device, according to an embodiment of the inventive concept.

FIG. 19 is a diagram for explaining an operating method of a storage device, according to an embodiment of the inventive concept, and in particular, a method of generating a first journal JN1 using a second journal JN2 in a storage device according to another embodiment of the inventive concept.

Referring to FIGS. 15 and 19, the FTL 130 may read a second journal JN2 from the nonvolatile memory 110 independently or by controlling a device controller. For example, the first physical address 'PA61' of the second journal JN2 may include super block information 'A,' changing logical address number information '6,' i.e., information about the number of changing logical addresses, and page number information '1.' In some embodiments of the inventive concept, since a 1$^{st}$ block of each super block is allocated to the first physical address of the first journal JN1, the FTL 130 may restore the first physical address 'PA111' of the first journal JN1 by adding channel information '1' and way information '1' to the first physical address 'PA61' of the second journal JN2 including the super block information 'A' and the page number information '1.' Since physical addresses are sequentially allocated to the first journal JN1 in an order according to a parallel writing method, the FTL 130 may further restore the remaining physical addresses 'PA121, PA131, PA141, PA211, and PA221' in a direction in which channels and ways increase so that finally as many physical addresses as a number corresponding to the changing logical address number information '6' may be restored, and may allocate the restored physical addresses 'PA121, PA131, PA141, PA211, and PA221' to the logical addresses 'L7, L28, L4, L10, and L15,' respectively.

The FTL 130 may write the first journal JN1 restored according to the above-described method to the buffer 140 independently or by controlling a device controller.

Figure 20:
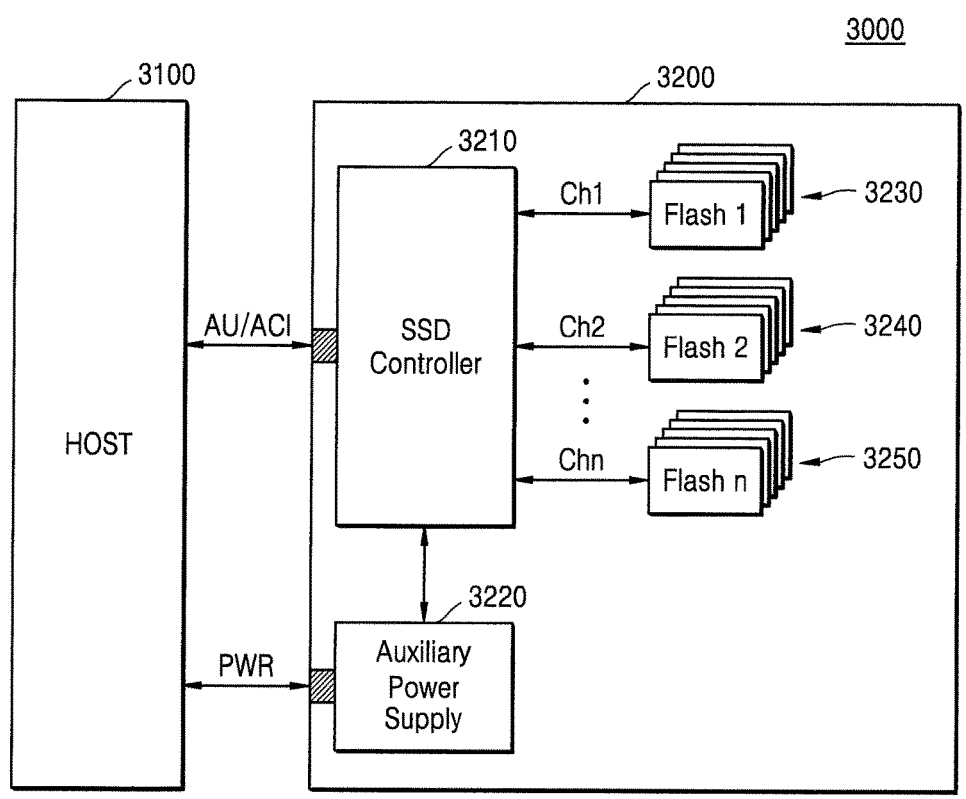
FIG. 20 is a block diagram illustrating an example of application of a storage device in a solid state drive (SSD) system, according to an example embodiment of the inventive concept.

FIG. 20 is a block diagram illustrating an application example of a storage device according to an embodiment in a solid state drive (SSD) system.

Referring to FIG. 20, an SSD system 3000 according to an embodiment may include a host 3100 and a SSD 3200. The SSD 3200 may transmit a signal to or receive a signal from the host 3100 through a signal connector, and may be supplied with power PWR through a power connector. The SSD 3200 may include an SSD controller 3210, an auxiliary power supply 3220, and a plurality of memory devices 3230, 3240, and 3250. The plurality of memory devices 3230, 3240, and 3250 may be vertically stacked NAND memory devices. The SSD 3200 may receive an address unit AU from a host as described above with reference to the embodiments of FIGS. 1 to 14, and store a second mapping table MP2 created using the address unit AU in the plurality of memory devices 3230, 3240, and 3250. The SSD 3200 may receive address change information ACI from the host as described above with reference to the embodiments of FIGS. 15 to 19, and store a second journal JN2 created using the address change information ACI in the plurality of memory devices 3230, 3240, and 3250.

While the inventive concept has been particularly shown and described with reference to embodiments thereof, it will be understood that various changes in form and details may be made therein without departing from the spirit and scope of the following claims.

What is claimed is:

1. A method of operating a storage device including a nonvolatile memory having a plurality of blocks, each of the plurality of blocks including a plurality of pages with a respective physical address for each page, the method comprising:
    receiving at least one address unit including a plurality of logical addresses;
    sorting the plurality of logical addresses in ascending or descending order to provide a plurality of sorted logical addresses; and
    sequentially allocating a physical address of a first level page in each block to the plurality of sorted logical addresses in a first mapping table until all first level pages are allocated; and then
    sequentially allocating a physical address of a second level page in each block to the plurality of sorted logical addresses in the first mapping table.

2. The method of claim 1, wherein the plurality of blocks are addressed using channel information and way information in the first mapping table, the channel information is configured to select a group of the blocks included in the plurality of blocks and the way information is configured to select one block included in the group of the blocks, the method further comprises:
    removing the channel information and way information from the first mapping table to provide a second mapping table.

3. The method of claim 2, wherein the nonvolatile memory comprises super blocks including at least one of the plurality of blocks, and the physical addresses include super block information about a super block including a corresponding page and page number information about a corresponding page number.

4. The method of claim 2, further comprising:
    receiving an access request to at least one logical address among the plurality of logical addresses; and
    adding the channel information and the way information to a physical address allocated to the at least one logical address in the second mapping table.

5. The method of claim 2, further comprising:
    storing the second mapping table in the nonvolatile memory.

6. The method of claim 1, further comprising:
    storing the first mapping table in at least one buffer.

7. The method of claim 1, wherein receiving the at least one address unit including a plurality of logical addresses comprises receiving plurality of address units,
    wherein sequentially allocating the physical address of the first level page in each block to the plurality of sorted logical addresses further comprises:
    sequentially allocating the physical address of the first level page in each block to the plurality of sorted logical addresses to include identification information for the plurality of address units.

8. The method of claim 1, further comprising:
    receiving address change information for the plurality of logical addresses;
    generating a first journal by sequentially allocating physical addresses to changing logical addresses included in the address change information;
    generating a second journal by allocating physical addresses to changing logical addresses; and
    storing the second journal in the nonvolatile memory.

9. The method of claim 8, wherein generating the second journal comprises:
    allocating a first physical address including changing logical address number information to a first changing logical address among the changing logical addresses; and
    skipping allocating of the physical addresses to remaining changing logical addresses except for a first changing logical address.

10. A method of operating a storage device including a nonvolatile memory, the method comprising:
    receiving, from a host, address change information including changing logical addresses for data to be stored in the nonvolatile memory;
    sequentially allocating physical addresses to the changing logical addresses included in the address change information to provide a first journal;
    removing a portion of at least one physical address allocated to the changing logical addresses to provide a second journal; and
    storing the second journal in the nonvolatile memory.

11. The method of claim 10, wherein the nonvolatile memory includes a plurality of blocks, each of the plurality of blocks including a plurality of pages;
    wherein sequentially allocating physical addresses to the changing logical addresses comprises:
    sequentially allocating a physical address of a first level page in each block to the changing logical addresses until all first level pages are allocated; and then
    sequentially allocating a physical address of a second level page in each block to the changing logical addresses.

12. The method of claim 10, wherein removing the portion of at least one physical address allocated to the changing logical addresses to provide a second journal comprises:
    allocating a first physical address including changing logical address number information indicating a number of the changing logical addresses to a first one of the changing logical addresses.

13. The method of claim 12, further comprising:
    reading the second journal from the nonvolatile memory;
    restoring the portion of the at least one physical address to provide a restored first journal
    storing the restored first journal in a buffer of the storage device.

14. The method of claim 10, wherein the storage device further comprises a buffer, and the method further comprises:
storing the first journal in the buffer;
receiving an access request to at least one of the changing logical addresses; and
outputting at least one physical address allocated to the at least one of the changing logical addresses based on the first journal, in response to the access request.

15. A storage device comprising:
a nonvolatile memory comprising a plurality of pages corresponding to a plurality of physical addresses, respectively, the nonvolatile memory divided into a meta area storing addresses, and a user area storing data;
a flash translation layer (FTL) configured to receive a plurality of logical addresses from an external source and configured to allocate the plurality of physical addresses to the plurality of logical addresses; and
an address sorter configured to sort the plurality of logical addresses in ascending or descending order to provide a plurality of sorted logical addresses and configured to output the plurality of sorted logical addresses to the flash translation layer,
wherein the flash translation layer is configured to deterministically allocate the plurality of physical addresses to the sorted plurality of logical addresses.

16. The storage device of claim 15, wherein the plurality of logical addresses comprise N logical addresses, wherein N is a natural number greater than 1,
the storage device further comprises a buffer storing the N logical addresses, and
the address sorter repeatedly reads at least one of the N logical addresses from the buffer to provide read logical addresses and sorts the read logical addresses until all of the N logical addresses are sorted.

17. The storage device of claim 16, wherein the buffer stores a mapping table including mapping information of the logical addresses and the physical addresses.

18. The storage device of claim 16, wherein the plurality of pages comprise a plurality of blocks,
the plurality of blocks are divided according to channels and ways, each channel connected to at least one of the plurality of blocks, the ways indicating an order in which the plurality of blocks are connected to the channels, and
the flash translation layer omits channel and way information from the physical addresses.

19. The storage device of claim 18, wherein the flash translation layer stores, in the meta area of the nonvolatile memory, a mapping table including mapping information about the logical addresses and the physical addresses.

20. The storage device of claim 15 wherein the flash translation layer is configured to sequentially allocate the plurality of physical addresses to the sorted plurality of logical addresses.

* * * * *